US012625404B2

(12) United States Patent
Shibata

(10) Patent No.: US 12,625,404 B2
(45) Date of Patent: May 12, 2026

(54) ELECTRO-OPTICAL APPARATUS AND ELECTRONIC DEVICE

(71) Applicant: SEIKO EPSON CORPORATION, Tokyo (JP)

(72) Inventor: Mayuko Shibata, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 19 days.

(21) Appl. No.: 18/757,414

(22) Filed: Jun. 27, 2024

(65) Prior Publication Data

US 2025/0004333 A1 Jan. 2, 2025

(30) Foreign Application Priority Data

Jun. 29, 2023 (JP) .................................. 2023-106810

(51) Int. Cl.
*G02F 1/1343* (2006.01)
*G02F 1/1333* (2006.01)
*G02F 1/1339* (2006.01)

(52) U.S. Cl.
CPC .. *G02F 1/134309* (2013.01); *G02F 1/133345* (2013.01); *G02F 1/1339* (2013.01)

(58) Field of Classification Search
None
See application file for complete search history.

(56) References Cited

U.S. PATENT DOCUMENTS 9,954,199 B2 * 4/2018 Ishii .................... H10K 59/8722
12,124,133 B2 * 10/2024 Kinoe ................. G02F 1/13439

| 2003/0038913 A1 * | 2/2003 | Choo ..................... G02F 1/1345 |
| | | 349/149 |
| 2005/0184980 A1 * | 8/2005 | Sato ...................... G09G 3/3648 |
| | | 345/204 |
| 2008/0122999 A1 * | 5/2008 | Tsuchiya ............... G02F 1/1395 |
| | | 349/33 |
| 2008/0252807 A1 * | 10/2008 | Huang .............. G02F 1/134336 |
| | | 349/54 |
| 2011/0095969 A1 * | 4/2011 | Ueda ................. G02F 1/133707 |
| | | 445/24 |
| 2013/0057812 A1 * | 3/2013 | Kwak ................... G02F 1/1339 |
| | | 257/E33.012 |
| 2013/0258263 A1 * | 10/2013 | Yasukawa ......... G02F 1/136286 |
| | | 349/138 |

(Continued)

FOREIGN PATENT DOCUMENTS

JP 2021033073 3/2021

*Primary Examiner* — Ryan Crockett

(74) *Attorney, Agent, or Firm* — JCIPRNET

(57) ABSTRACT

An electro-optical apparatus includes a first substrate, a second substrate, an electro-optical layer, and a sealing member, and has a display area, a sealing area, and an intermediate area, the first substrate includes a first electrode provided for each of pixels included in the display area, a first coupling electrode, a first contact that electrically couples the first electrode to the first coupling electrode, a second electrode provided in an intermediate area and located in the same layer as the first electrode, a second coupling electrode, and a second contact that electrically couples the second electrode to the second coupling electrode, and the second electrode is divided into a plurality of electrode portions directed from an outer edge of the first substrate to the display area.

12 Claims, 14 Drawing Sheets

(56) References Cited

U.S. PATENT DOCUMENTS

| | | | |
|---|---|---|---|
| 2014/0104529 A1* | 4/2014 | Ikeda | G02F 1/13394 |
| | | | 349/43 |
| 2014/0160413 A1* | 6/2014 | Nishida | G02F 1/134309 |
| | | | 349/123 |
| 2015/0062515 A1* | 3/2015 | Tomioka | G02F 1/133345 |
| | | | 349/123 |
| 2016/0209685 A1* | 7/2016 | Tomikawa | G02F 1/1333 |
| 2017/0131601 A1* | 5/2017 | Jiang | G02F 1/1368 |
| 2019/0146282 A1* | 5/2019 | Tanaka | G02F 1/1339 |
| | | | 349/123 |
| 2021/0063830 A1* | 3/2021 | Ito | G02F 1/136286 |
| 2022/0197073 A1* | 6/2022 | Deng | H10D 86/451 |

* cited by examiner

ELECTRO-OPTICAL APPARATUS AND ELECTRONIC DEVICE

The present application is based on, and claims priority from JP Application Serial Number 2023-106810, filed Jun. 29, 2023, the disclosure of which is hereby incorporated by reference herein in its entirety.

BACKGROUND

1. Technical Field

The present disclosure relates to an electro-optical apparatus and an electronic device.

2. Related Art

For electronic devices such as projectors, for example, electro-optical apparatuses such as liquid crystal display apparatuses whose optical characteristics can be changed for each pixel are used. As an example of an electro-optical apparatus, an electro-optical apparatus described in JP-A-2021-33073 is known.

The electro-optical apparatus described in JP-A-2021-33073 includes an element substrate, a counter substrate, a liquid crystal layer disposed between the substrates, and a sealing member disposed between the substrates and configured to seal the liquid crystal layer. Further, the electro-optical apparatus includes a display area and a surrounding area surrounding the display area in plan view. A sealing member is disposed in the surrounding area. A drive circuit is disposed in the surrounding area of the element substrate. Further, a pixel electrode and an alignment film disposed on the pixel electrode are provided in the display area of the element substrate. The pixel electrode is electrically coupled to a relay electrode located at a layer under the pixel electrode via a contact portion that is a columnar plug that penetrates the insulating layer.

Since the contact portion is the columnar plug, it is possible to improve flatness on the pixel electrode. Therefore, a decrease in adhesion of the alignment film provided on the pixel electrode is curbed. Therefore, it is considered that a decrease in transmittance can be curbed.

Further, a case in which, for example, an electrode coupling the drive circuit to the pixel electrode is disposed on the same layer as the pixel electrode in an area between the display area and the sealing member is considered. In this case, when a columnar plug is coupled to the electrode, flatness on the electrode improve, similar to that of the pixel electrode. However, when the flatness of the electrode improves, there is concern that impurities generated from the sealing member may easily infiltrate the display area. As a result, there is concern that display stains may be generated and display quality may be degraded due to impurity infiltration into the display area.

SUMMARY

An aspect of an electro-optical apparatus of the present disclosure is an electro-optical apparatus including a first substrate, a second substrate, an electro-optical layer disposed between the first substrate and the second substrate and having optical characteristics changing depending on an electric field, and a sealing member disposed outside the electro-optical layer between the first substrate and the second substrate in plan view, the electro-optical apparatus including: a display area for displaying an image, a sealing area located outside the display area in plan view and provided with the sealing member, and an intermediate area located between the display area and the sealing area in plan view, wherein the first substrate includes a first electrode provided for each of pixels included in the display area, a first coupling electrode provided in the display area and farther from the electro-optical layer than the first electrode in a first direction in which the first substrate and the second substrate overlap, an insulating layer provided between the first electrode and the first coupling electrode, a first contact provided in the insulating layer and configured to electrically couple the first electrode to the first coupling electrode, a second electrode provided in the intermediate area and located in the same layer as the first electrode, a second coupling electrode provided in the intermediate area and farther from the electro-optical layer than the second electrode in the first direction, and a second contact provided in the insulating layer and configured to electrically couple the second electrode to the second coupling electrode, the first contact has a plug shape and is disposed in a first through hole provided in the insulating layer, the second contact has a plug shape and is disposed in a second through hole provided in the insulating layer, and the second electrode is divided into a plurality of electrode portions directed from an outer edge of the first substrate to the display area.

DESCRIPTION OF EMBODIMENTS

Figure 1:
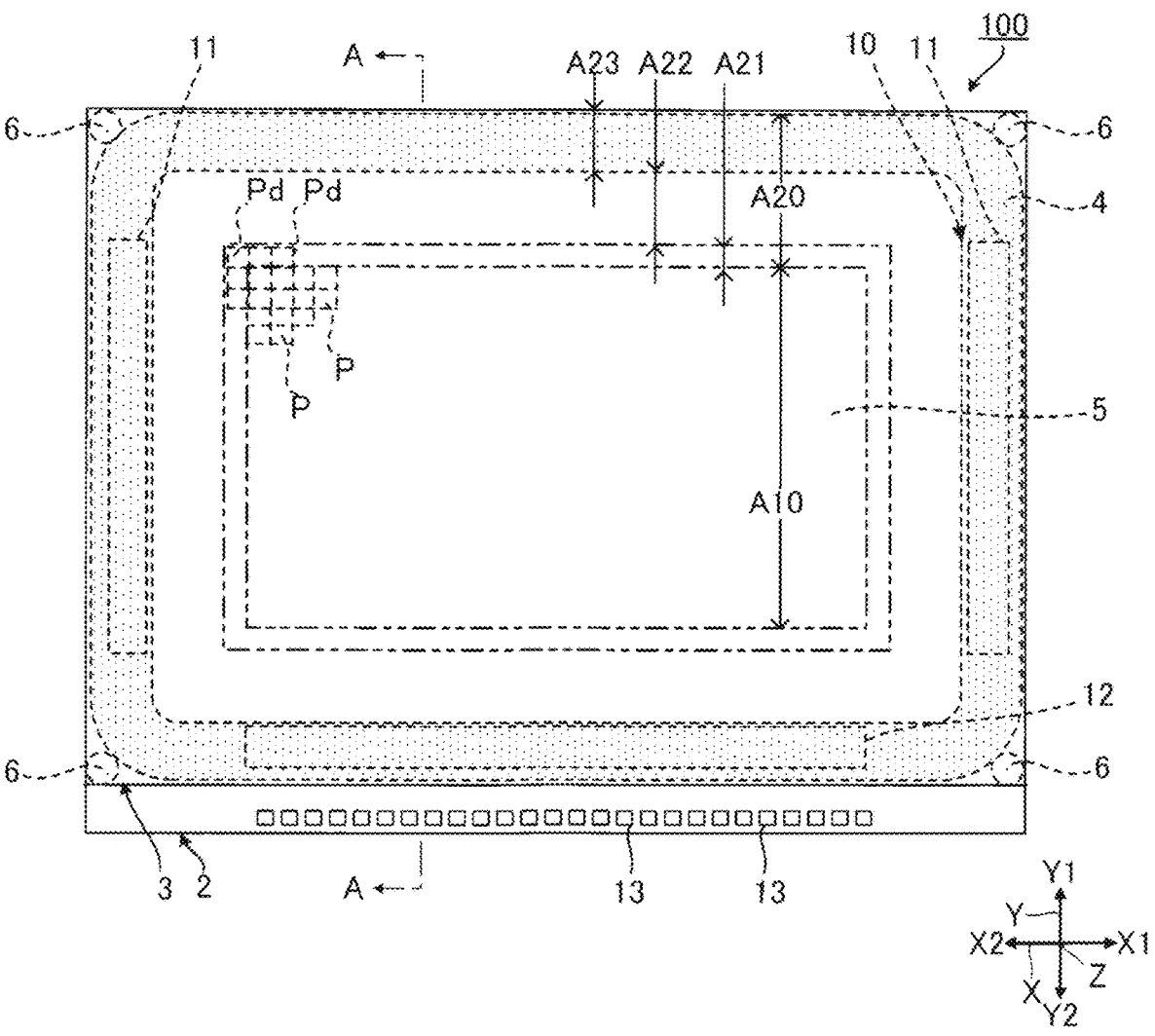
FIG. 1 is a plan view of an electro-optical apparatus according to a first embodiment.

Hereinafter, preferred embodiments of the present disclosure will be described with reference to the accompanying drawings. In the drawings, dimensions or scales of respective portions may be appropriately different from actual sizes, and there are portions schematically illustrated to facilitate understanding. Further, the scope of the present disclosure is not limited to these forms unless there is a particular statement that limits the present disclosure in the following description.

1. Electro-Optical Apparatus

A. First Embodiment

A-1. Basic Configuration

Figure 2:
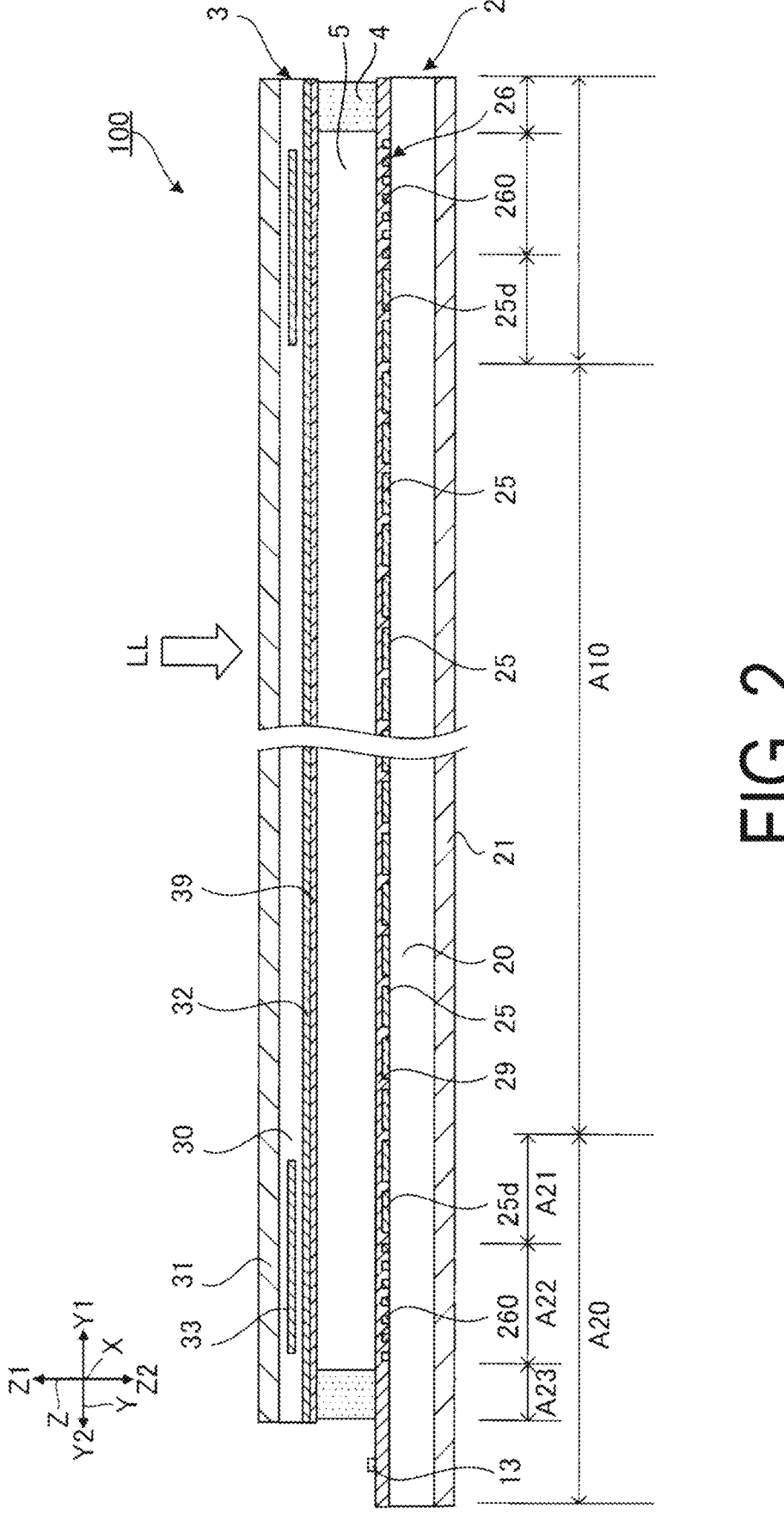
FIG. 2 is a cross-sectional view taken along line A-A of the electro-optical apparatus illustrated in FIG. 1.

FIG. 1 is a plan view of an electro-optical apparatus 100 according to an embodiment. FIG. 2 is a cross-sectional view taken along line A-A of the electro-optical apparatus 100 illustrated in FIG. 1. In the following description, an X-axis, a Y-axis, and a Z-axis which are orthogonal to each other will be used appropriately for convenience of description. Further, one direction along the X-axis is referred to as an X1 direction, and a direction opposite to the X1 direction is referred to as an X2 direction. Similarly, one direction along the Y-axis is referred to as a Y1 direction, and a direction opposite to the Y1 direction is referred to as a Y2 direction. One direction along the Z-axis is referred to as a Z1 direction, and a direction opposite to the Z1 direction is referred to as a Z2 direction.

Further, "electrical coupling" between element $\alpha$ and element $\beta$ includes not only a configuration in which element $\alpha$ and element $\beta$ are directly bonded to each other to establish electrical conduction, but also a configuration in which element $\alpha$ and element $\beta$ establish electrical conduction indirectly through another conductor. Furthermore, "substantially equal" includes not only strictly equal, but also a difference within a manufacturing error level.

The electro-optical apparatus 100 illustrated in FIGS. 1 and 2 is a transmissive electro-optical apparatus using an active matrix drive scheme. As illustrated in FIG. 2, the electro-optical apparatus 100 includes a first substrate 2, a second substrate 3, a sealing member 4, and a liquid crystal layer 5. Further, as illustrated in FIG. 2, the first substrate 2, the liquid crystal layer 5, and the second substrate 3 are disposed in that order in the Z1 direction. Therefore, a first direction in which the first substrate 2 and the second substrate 3 overlap is the Z1 direction or the Z2 direction. Viewing from the Z1 direction or Z2 direction, which is a direction in which the first substrate 2, the liquid crystal layer 5, and the second substrate 3 overlap, is defined as a "plan view". Furthermore, although a planar shape of the electro-optical apparatus 100 illustrated in FIG. 1 is a quadrangle, the planar shape may be a polygon other than a quadrangle, or a circle.

The electro-optical apparatus 100 illustrated in FIG. 2 is of a transmission type, and the first substrate 2 and the second substrate 3 have light transmittance. An image is displayed by incident light LL being modulated between incidence on the second substrate 3 and emission from the first substrate 2. An image may be displayed by light incident on the first substrate 2 being modulated while being emitted from the second substrate 3. Further, "light transmittance" means transmittance to visible light, and means that transmittance of visible light is preferably 50% or more.

The first substrate 2 includes a first base portion 21, a stack 20, a plurality of pixel electrodes 25, a plurality of dummy pixel electrodes 25*d*, a surrounding electrode 26, and an alignment film 29. The pixel electrode 25 corresponds to a "first electrode". The surrounding electrode 26 corresponds to a "second electrode". The first base portion 21, the stack 20, the plurality of pixel electrodes 25, and the alignment film 29 are stacked in that order in the 21 direction. The plurality of pixel electrodes 25, the plurality of dummy pixel electrodes 25*d*, and the surrounding electrode 26 are disposed on the same layer.

The first base portion 21 is a flat plate having light transmittance and an insulation property, and is made of, for example, a glass substrate or a quartz substrate. Although not illustrated in detail, the stack 20 includes a plurality of insulating films having light transmittance and an insulation property. Each insulating film includes an inorganic silicon material. The inorganic silicon material is an inorganic compound containing silicon, such as a silicon oxide or a silicon oxynitride. Further, the stack 20 is provided with a transistor 240 illustrated in FIG. 3, which will be described later, various wiring lines, and the like.

The plurality of pixel electrodes 25, the plurality of dummy pixel electrodes 25*d*, and the surrounding electrode 26 in FIG. 2 are disposed on the stack 20. The plurality of pixel electrodes 25 apply an electric field to the liquid crystal layer 5. The plurality of dummy pixel electrodes 25*d* do not contribute to a display, but have the same configuration as the plurality of pixel electrodes 25, and are driven and controlled in the same manner as the plurality of pixel electrodes 25. For example, the plurality of dummy pixel electrodes 25*d* are used, for example, for measures for noise in image signals written to the plurality of pixel electrodes 25. The surrounding electrode 26 is an ion trapping electrode that traps ionic impurities in the liquid crystal layer 5. The surrounding electrode 26 has a plurality of electrode portions 260. Each of the plurality of pixel electrodes 25, the plurality of dummy pixel electrodes 25*d*, and the surrounding electrode 26 contains a transparent conductive material such as indium tin oxide (ITO), indium zinc oxide (IZO), or fluorine-doped tin oxide (FTO). The plurality of pixel electrodes 25, the plurality of dummy pixel electrodes 25*d*, and the surrounding electrode 26 are formed all at once, for example, by etching a conductive film containing the transparent conductive material.

The alignment film 29 has light transmittance and an insulation property. The alignment film 29 is in contact with the liquid crystal layer 5 and aligns liquid crystal molecules included in the liquid crystal layer 5. The alignment film 29 covers the plurality of pixel electrodes 25, the plurality of dummy pixel electrodes 25*d*, and the surrounding electrode 26. A material of the alignment film 29 is, for example, a silicon oxide. The alignment film 29 is formed, for example, by oblique deposition.

Further, as illustrated in FIG. 1, a drive circuit 10 and a plurality of external terminals 13 are disposed on the first substrate 2. The drive circuit 10 includes a scanning line drive circuit 11 and a signal line drive circuit 12. Some of the plurality of external terminals 13 are coupled to a wiring (not illustrated) routed from the scanning line drive circuit 11 or the signal line drive circuit 12. Further, the plurality of external terminals 13 include a terminal to which a constant potential Vcom is applied.

As illustrated in FIG. 2, the second substrate 3 is spaced apart from the first substrate 2 and faces the first substrate 2.

The second substrate 3 includes a second base portion 31, a stack 30, a counter electrode 32, an alignment film 39, and a parting portion 33. The second base portion 31, the stack 30, the counter electrode 32, and the alignment film 39 are stacked in that order in the Z2 direction.

The second base portion 31 illustrated in FIG. 2 is a flat plate having light transmittance and an insulation property, and is made of, for example, a glass substrate or a quartz substrate. The stack 30 has light transmittance and an insulation property, and contains an inorganic silicon material. Furthermore, the stack 30 is provided with the parting portion 33. The parting portion 33 is a light shielding portion that surrounds the plurality of pixel electrodes 25 in plan view. The parting portion 33, for example, overlaps the plurality of dummy pixel electrodes 25d and the surrounding electrode 36 in plan view. "Light shielding property" means a light shielding property against visible light, and preferably means that a transmittance of the visible light is less than 50%, and more preferably 10% or less. Examples of a material of the parting portion 33 may include a metal such as tungsten (W), titanium (Ti), chromium (Cr), iron (Fe), or aluminum (Al), an alloy of metals, a metal silicide that is an alloy of the metals and silicon, and a metal compound such as a metal nitride. Although not illustrated, the stack 30 may include, for example, a plurality of microlenses.

The counter electrode 32 applies an electric field to the liquid crystal layer 5. The counter electrode 32 has light transmittance and conductivity. The counter electrode 32 includes, for example, a transparent conductive material such as ITO, IZO, or FTO. The alignment film 39 has light transmittance and an insulation property. The alignment film 39 is in contact with the liquid crystal layer 5 and aligns liquid crystal molecules included in the liquid crystal layer 5. The alignment film 39 is disposed on the counter electrode 32. A material of the alignment film 39 is, for example, a silicon oxide. The alignment film 39 is formed, for example, by oblique deposition.

Further, as illustrated in FIG. 1, a plurality of inter-substrate conductive members 6 are provided between the first substrate 2 and the second substrate 3. The plurality of inter-substrate conductive members 6 are conductive members for electrically coupling the first substrate 2 to the second substrate 3. The inter-substrate conductive member 6 is coupled to the terminal to which the constant potential Vcom is applied among the plurality of external terminals 13 via a lead-out wiring (not illustrated) disposed on the first substrate 2. Therefore, the constant potential Vcom is applied to the counter electrode 32.

The sealing member 4 is disposed between the first substrate 2 and the second substrate 3 and seals the liquid crystal layer 5. In FIG. 1, dots are attached to the sealing member 4 so that the disposition of the sealing member 4 can be easily understood. The sealing member 4 contains a UV curable material such as epoxy resin. UV is an abbreviation for ultraviolet, and particularly refers to light with a wavelength of 100 nm or more and 400 nm or less. Further, the sealing member 4 may contain a gap material made of an inorganic material such as glass. Further, as illustrated in FIG. 1, the sealing member 4 is disposed outside the liquid crystal layer 5.

As illustrated in FIG. 2, the liquid crystal layer 5 is disposed between the first substrate 2 and the second substrate 3. Specifically, the liquid crystal layer 5 is disposed within an area surrounded by the first substrate 2, the second substrate 3, and the sealing member 4. The liquid crystal layer 5 is an electro-optical layer whose optical characteristics change depending on an electric field. The liquid crystal layer 5 includes liquid crystal molecules having positive or negative dielectric anisotropy. Orientation of the liquid crystal molecules changes depending on a voltage applied to the liquid crystal layer 5.

As illustrated in FIG. 1, the electro-optical apparatus 100 includes a display area A10 and a surrounding area A20. The display area A10 is an area where an image is displayed. A plurality of pixels P disposed in a matrix are provided in the display area A10. The above-described pixel electrode 25 is provided for each pixel P. Therefore, the plurality of pixel electrodes 25 are provided in the display area A10. Moreover, the counter electrode 32 described above is provided in common for a plurality of pixels P.

The surrounding area A20 is provided outside the display area A10 in plan view, and is provided along an outer edge of the display area A10 in plan view. The surrounding area A20 has a frame shape that surrounds the display area A10 in plan view. The surrounding area A20 includes a dummy pixel area A21, an intermediate area A22, and a sealing area A23. Each of these areas is provided along the outer edge of the display area A10 in plan view. In the illustrated example, each of the areas has a planar shape of a quadrangular frame. The dummy pixel area A21 is located between the display area A10 and the intermediate area A22. A plurality of dummy pixels Pd are provided in the dummy pixel area A21. The dummy pixel electrode 25d is provided for each dummy pixel Pd. Therefore, the plurality of dummy pixel electrodes 25d are provided in the dummy pixel area A21. The intermediate area A22 is an area located between the display area A10 and the sealing area A23. In the intermediate area A22, the surrounding electrode 26 is disposed. The sealing member 4 is disposed in the sealing area A23. Furthermore, the drive circuit 10 and the plurality of external terminals 13 are disposed in the surrounding area A20. A portion of the drive circuit 10 may be provided in the intermediate area A22.

The electro-optical apparatus 100 is applied to, for example, a display apparatus that performs color display such as a personal computer or a smartphone, which will be described later. When the electro-optical apparatus 100 is applied to the display apparatus, a color filter is appropriately used for the electro-optical apparatus 100. Further, the electro-optical apparatus 100 is applied to, for example, a projection type projector, which will be described later. In this case, the electro-optical apparatus 100 functions as a light valve. In this case, the color filter is omitted from the electro-optical apparatus 100.

A-2. Electrical Configuration of First Substrate 2

Figure 3:
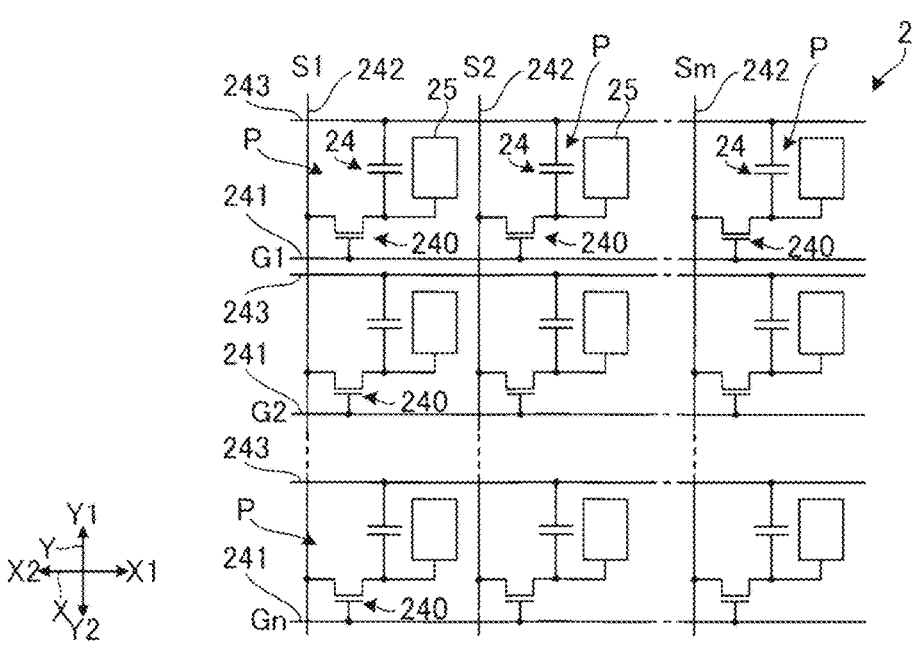
FIG. 3 is an equivalent circuit diagram illustrating an electrical configuration of a first substrate in FIG. 1.

FIG. 3 is an equivalent circuit diagram illustrating an electrical configuration of the first substrate 2 in FIG. 1. As illustrated in FIG. 3, the first substrate 2 includes a plurality of transistors 240, n scanning lines 241, m signal lines 242, and n constant potential lines 243. These are disposed in the stack 20 in FIG. 2. n and m are integers equal to or greater than 2. Further, a transistor 240 is disposed corresponding to each of intersections between the n scanning lines 241 and the m signal lines 242. Each transistor 240 is, for example, a thin film transistor (TFT) that functions as a switching element. Each transistor 240 includes a gate, a source, and a drain.

Each of the n scanning lines 241 extends in the X1 direction, and the n scanning lines 241 are disposed at equal intervals in the Y1 direction. Each of the n scanning lines 241 is electrically coupled to the gates of the corresponding plurality of transistors 240. The n scanning lines 241 are electrically coupled to the scanning line drive circuit 11 illustrated in FIG. 1. Scanning signals G1, G2, . . . , and Gn are supplied line-sequentially from the scanning line drive circuit 11 to the 1 to n scanning lines 241.

Each of the m signal lines 242 illustrated in FIG. 3 extends in the Y1 direction, and the m signal lines 242 are arranged at equal intervals in the X1 direction. Each of the m signal lines 242 is electrically coupled to the sources of the corresponding plurality of transistors 240. The m signal lines 242 are electrically coupled to the signal line drive circuit 12 illustrated in FIG. 1. Image signals S1, S2, . . . , and Sm are supplied in parallel from the signal line drive circuit 12 to the 1 to m signal lines 242.

The n scanning lines 241 and the m signal lines 242 illustrated in FIG. 3 are electrically insulated from each other and disposed in a grid pattern in plan view. An area surrounded by two adjacent scanning lines 241 and two adjacent signal lines 242 corresponds to the pixel P. The transistor 240, the pixel electrode 25, and a storage capacitor 24 are provided for each pixel P. The pixel electrodes 25 are provided on a one to one basis for the transistors 240. Each pixel electrode 25 is electrically coupled to the drain of the corresponding transistor 240.

Each of the n constant potential lines 243 extends in the X1 direction, and the n constant potential lines 243 are disposed at equal intervals in the Y1 direction. Further, the n constant potential lines 243 are electrically insulated from the n scanning lines 241 and the m signal lines 242, and are disposed at intervals from these lines. The constant potential Vcom is applied to each constant potential line 243. Each of the n constant potential lines 243 is electrically coupled to one of the two electrodes of the corresponding storage capacitor 24. Each storage capacitor 24 is a storage capacitor for holding a potential of the pixel electrode 25. The storage capacitor 24 is provided on a one-to-one basis for the transistor 240. Further, the other of the two electrodes of each storage capacitor 24 is electrically coupled to the corresponding pixel electrode 25. Therefore, the constant potential Vcom is applied to one electrode of the storage capacitor 24, and the other electrode is electrically coupled to the drain of the transistor 240.

When the scanning signals G1, G2, . . . , and Gn are sequentially activated and the n scanning lines 241 are sequentially selected, the transistors 240 coupled to the selected scanning lines 241 come to an ON state. Then, potentials corresponding to the image signals S1, S2, . . . and Sm with a magnitude corresponding to a gradation to be displayed are applied to the pixel electrodes 25 of the pixels P corresponding to the selected scanning line 241 via the m signal lines 242. Accordingly, a voltage corresponding to the gradation to be displayed is applied to a liquid crystal capacitor formed between the pixel electrode 25 and the counter electrode 32, and the orientation of the liquid crystal molecules changes according to the applied voltage. Furthermore, the applied voltage is held by the storage capacitor 24. Light is modulated due to such changes in the orientation of liquid crystal molecules, making gradation display possible.

A-3. Surrounding Area A20

Figure 4:
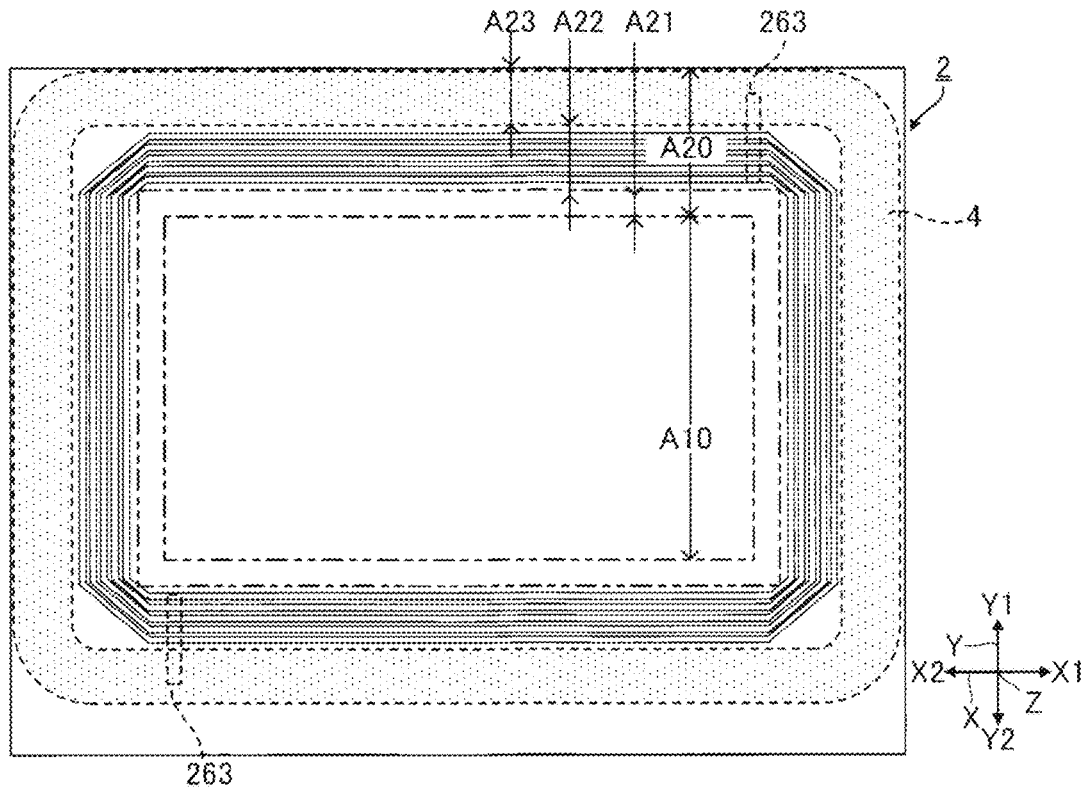
FIG. 4 is a plan view of a surrounding electrode in FIG. 2.

FIG. 4 is a plan view of the surrounding electrode 26 in FIG. 2. As illustrated in FIG. 4, the surrounding electrode 26 is disposed outside the display area A10. The surrounding electrode 26 includes the plurality of electrode portions 260 spaced apart from each other. Each electrode portion 260 has a frame shape surrounding the display area A10. Each electrode portion 260 has a substantially quadrangular frame shape in plan view. The number of the plurality of electrode portions 260 is not particularly limited as long as the number is two or more, and is arbitrary. Further, a separation distances between the plurality of electrode portions 260 may be equal to each other or may be different from each other.

Figure 5:
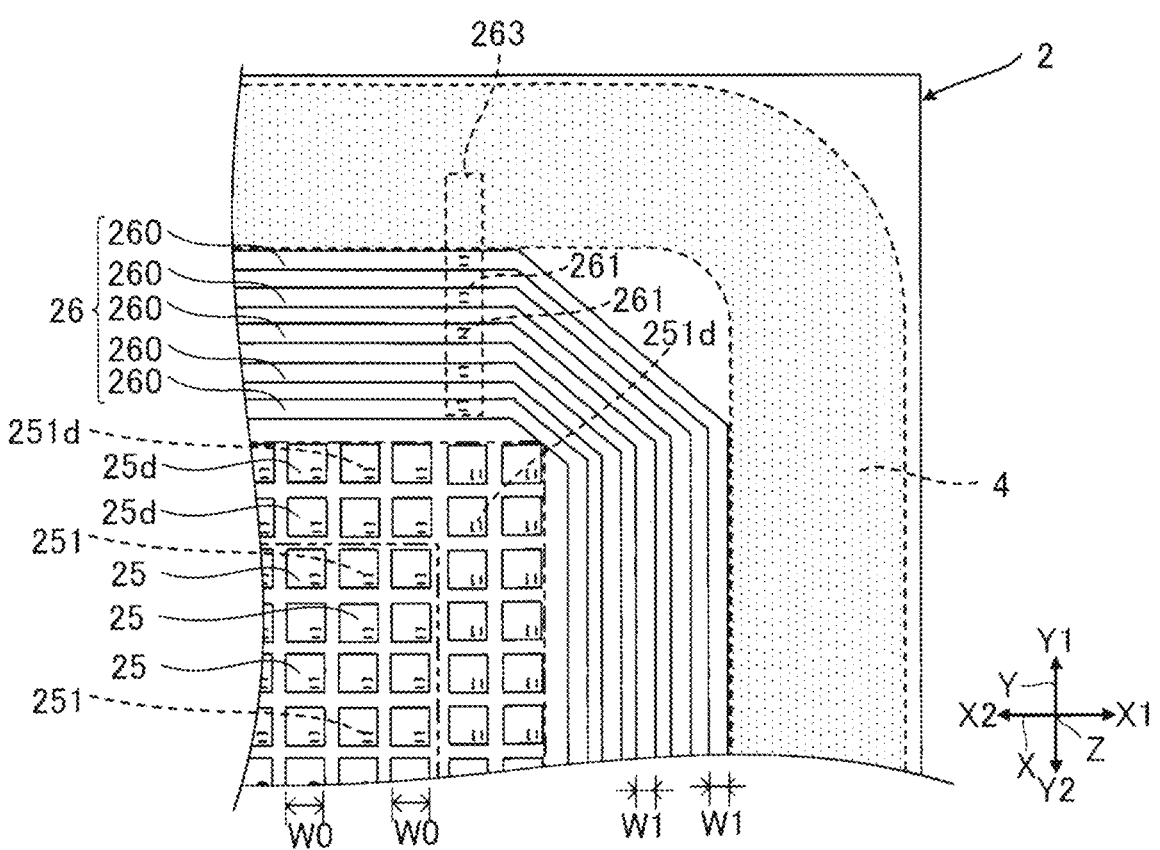
FIG. 5 is a plan view of a portion of the first substrate in FIG. 2.

FIG. 5 is a plan view of a portion of the first substrate 2 in FIG. 2. As illustrated in FIG. 5, the plurality of pixel electrodes 25 are disposed in a matrix. The plurality of dummy pixel electrodes 25d are disposed outside the plurality of pixel electrodes 25 in plan view. The plurality of dummy pixel electrodes 25d are disposed between the plurality of pixel electrodes 25 and the surrounding electrode 26. The plurality of dummy pixel electrodes 25d are disposed in a matrix along with the plurality of pixel electrodes 25.

Figure 6:
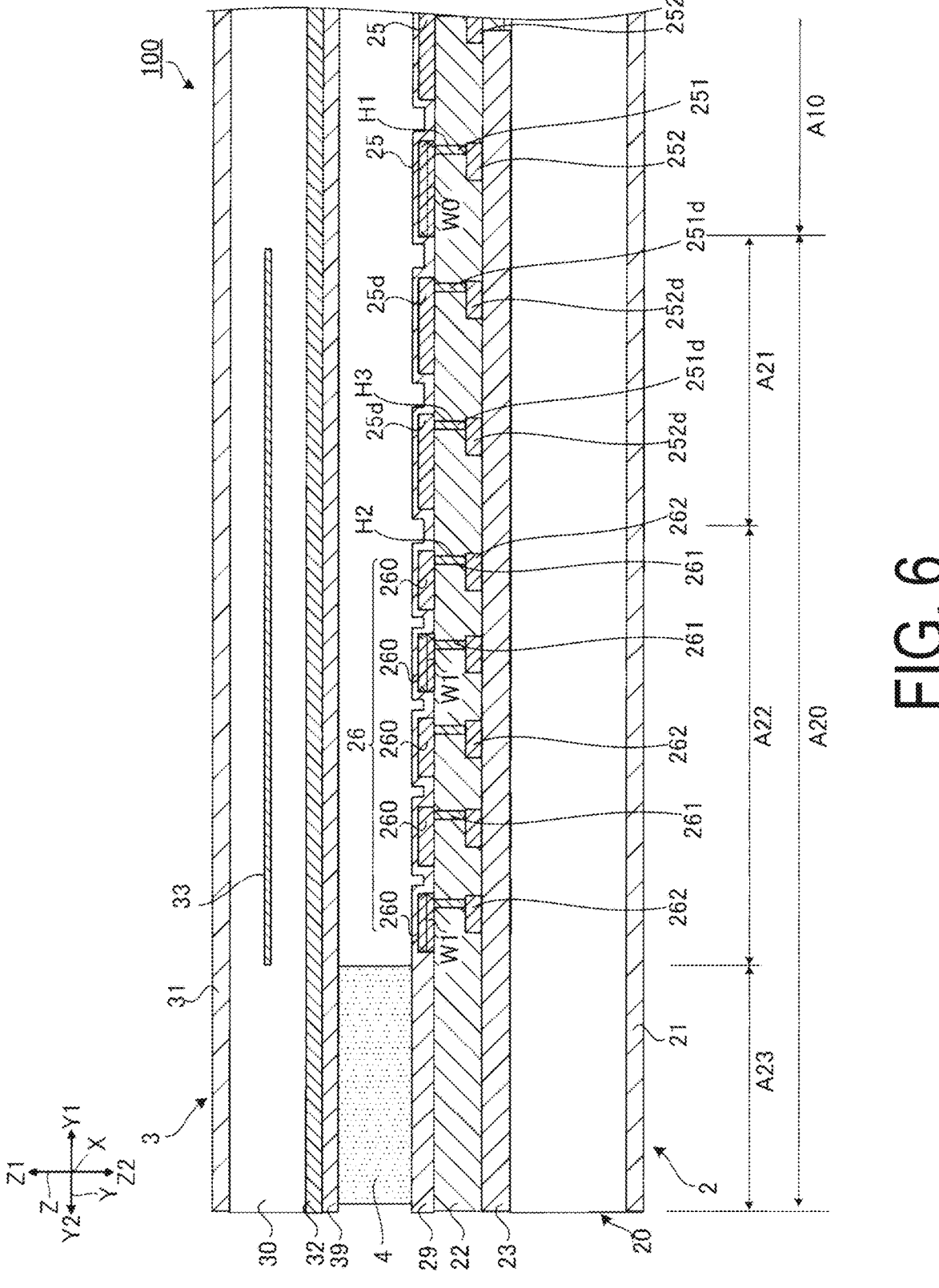
FIG. 6 is a cross-sectional view of a portion of the electro-optical apparatus in FIG. 2.

FIG. 6 is a cross-sectional view of a portion of the electro-optical apparatus 100 in FIG. 2. As illustrated in FIG. 6, the stack 20 includes a first insulating layer 22 and a second insulating layer 23. The first insulating layer 22 is an example of an "insulating layer". The first insulating layer 22 is an uppermost layer of the stack 20 closest to the liquid crystal layer 5 among the plurality of insulating films included in the stack 20. The plurality of pixel electrodes 25, the plurality of dummy pixel electrodes 25d, and the surrounding electrode 26 are disposed on the first insulating layer 22.

The second insulating layer 23 is a layer under the first insulating layer 22 and is in contact with the first insulating layer 22. The plurality of first coupling electrodes 252, the plurality of third coupling electrodes 252d, and the plurality of second coupling electrodes 262 are provided in the second insulating layer 23.

The plurality of first coupling electrodes 252 are disposed on a one-to-one basis for the plurality of pixel electrodes 25, and overlap the plurality of pixel electrodes 25 in plan view. Each of the first coupling electrodes 252 is provided at a position farther from the liquid crystal layer 5 than the pixel electrode 25 in a direction along the Z axis, which is the first direction. Further, the plurality of third coupling electrodes 252d are disposed on a one-to-one basis for the plurality of dummy pixel electrodes 25d, and overlap the plurality of dummy pixel electrodes 25d in plan view. Each third coupling electrode 252d is provided at a position farther from the liquid crystal layer 5 than the dummy pixel electrode 25d in the direction along the Z axis, which is the first direction. Further, the plurality of second coupling electrodes 262 are disposed on a one-to-one basis for the plurality of electrode portions 260, and overlap the plurality of electrode portions 260 in plan view. Each second coupling electrode 262 is provided at a position farther from the liquid crystal layer 5 than the surrounding electrode 26 in the direction along the Z axis, which is the first direction.

Each pixel electrode 25 is coupled to a first coupling electrode 252 via a first contact 251. The first contact 251 is a contact plug disposed in a first through hole H1 provided in the first insulating layer 22. The first contact 251 has a columnar plug shape that fills the first through hole H1. Since the first contact 251 has the plug shape, it is possible to improve flatness of an upper surface of the pixel electrode 25. Therefore, a decrease in adhesion between the pixel electrode 25 and the alignment film 29 is curbed. Therefore, it is possible to curb a decrease in transmittance.

Each dummy pixel electrode 25d is coupled to the third coupling electrode 252d via a third contact 251d. The third contact 251d is a contact plug disposed in a third through hole H3 provided in the first insulating layer 22. The third contact 251d has a columnar plug shape that fills the third through hole H3. Since the third contact 251d has a plug shape like the first contact 251, the first contact 251 and the third contact 251*d* can be formed in the same process, which facilitates manufacturing.

Figure 18:
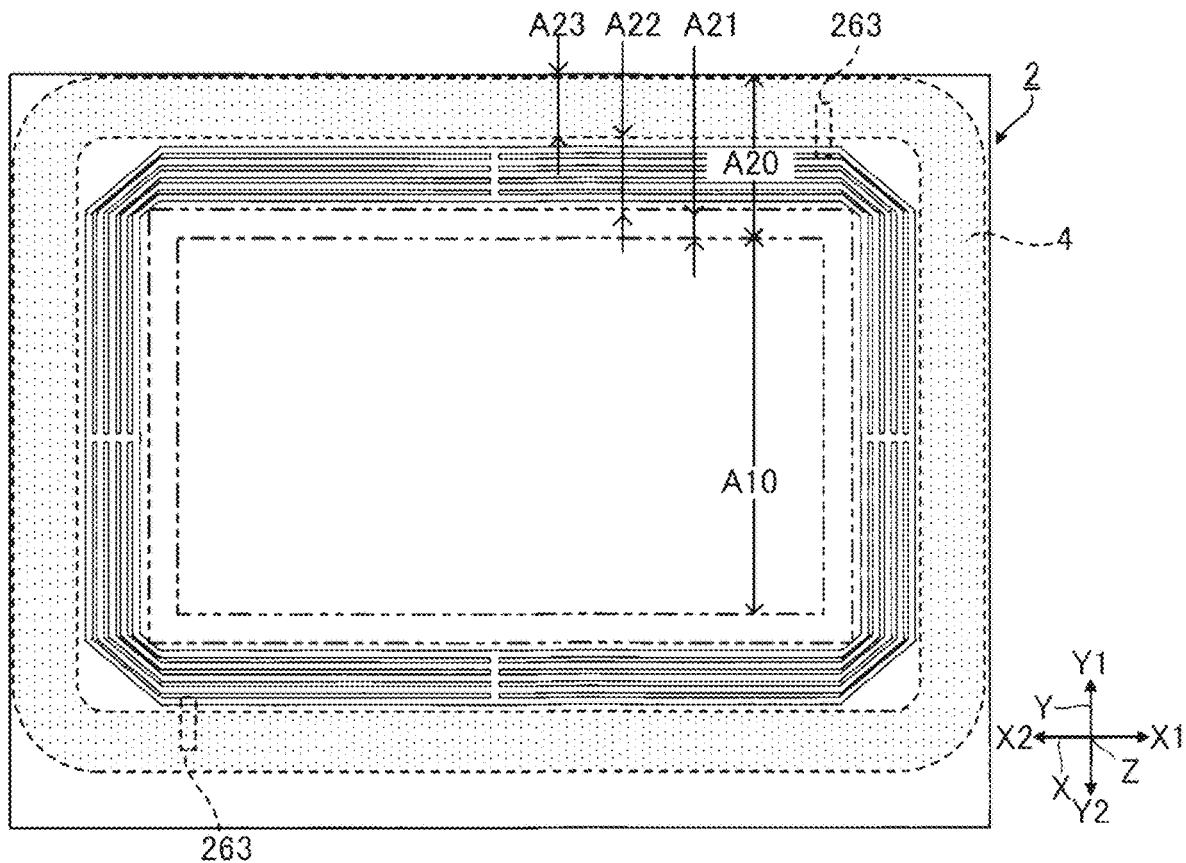
FIG. 18 is a plan view of a surrounding electrode of a modification example.

Each electrode portion 260 is coupled to a second coupling electrode 262 via a second contact 261. The second contact 261 is a contact plug disposed in a second through hole H2 provided in the first insulating layer 22. The second contact 261 has a columnar plug shape that fills the second through hole H2. Since the second contact 261 has a plug shape like the first contact 251, the first contact 251 and the second contact 261 can be formed in the same process, which facilitates manufacturing. Further, as illustrated in FIG. 5, the second contact 261 is disposed near a corner of an electrode 263. The second contact 261 is electrically coupled to the above-described drive circuit 10 via the plurality of second coupling electrodes 262 and electrodes 263. The plurality of second coupling electrodes 262 and electrodes 263 may be integrally formed. Further, for example, as illustrated in FIG. 18, the plurality of electrode portions 260 may have portions that are coupled to each other. In this case, for example, since any one of the plurality of electrode portions 260 is coupled to the electrodes 263, the plurality of electrode portions 260 are electrically coupled to the above-described drive circuit 10 via the electrode 263. In this case, the plurality of electrode portions 260 may be coupled to one second contact 261 and one second coupling electrode 262.

As described above, examples of materials of the pixel electrode 25, the dummy pixel electrode 25*d*, and the electrode portion 260 include transparent conductive materials such as ITO, IZO, and FTO. Each of the pixel electrode 25, the dummy pixel electrode 25*d*, and the electrode portion 260 may have a single layer structure or a stacked structure. Further, examples of the materials of the first coupling electrode 252, the second coupling electrode 262, and the third coupling electrode 252*d* may include a metal such as aluminum (Al) or titanium (Ti), an alloy containing the metal, and a transparent conductive material. Each of the first coupling electrode 252, the second coupling electrode 262, and the third coupling electrode 252*d* may have a single layer structure or a stacked structure.

Examples of materials of the first contact 251, the second contact 261, and the third contact 251*d* may include a metal such as tungsten, a metal silicide that is an alloy of the metal and silicon, and a metal compound such as a metal nitride. Each of the first contact 251, the second contact 261, and the third contact 251*d* may have a single layer structure or a stacked structure. In particular, each of the materials of the first contact 251, the second contact 261, and the third contact 251*d* preferably contains tungsten. Tungsten has excellent heat resistance, and since the tungsten is used, a through hole with a high aspect ratio can be suitably filled.

A-4. Surrounding Electrode 26

As described above, the surrounding electrode 26 includes a plurality of electrode portions 260 spaced apart from each other. That is, the surrounding electrode 26 is divided into the plurality of electrode portions 260 spaced apart from each other. As illustrated in FIG. 4, the plurality of electrode portions 260 is directed from an outer edge of the first substrate 2 to the display area A10. In particular, the plurality of electrode portions 260 are arranged from the outer edge of the first substrate 2 to the display area A10. Since the surrounding electrode 26 is provided, it is possible to lengthen the path from the sealing member 4 to the display area A10 via a space between the liquid crystal layer 5 and the first substrate 2. Therefore, it is possible to curb display defects such as occurrence of display stains caused by impurities infiltrating the display area A10. Therefore, it is possible to curb deterioration in display quality.

Figure 7:
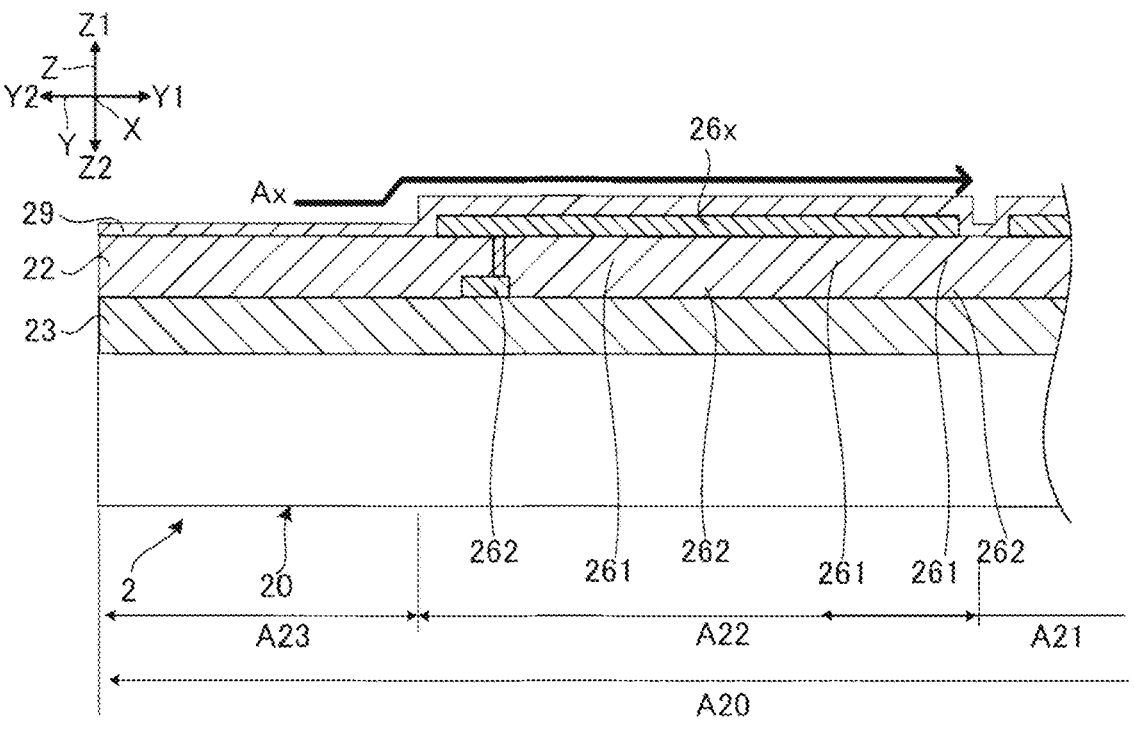
FIG. 7 is a diagram illustrating an impurity infiltration path in a surrounding electrode of a comparative example.
Figure 8:
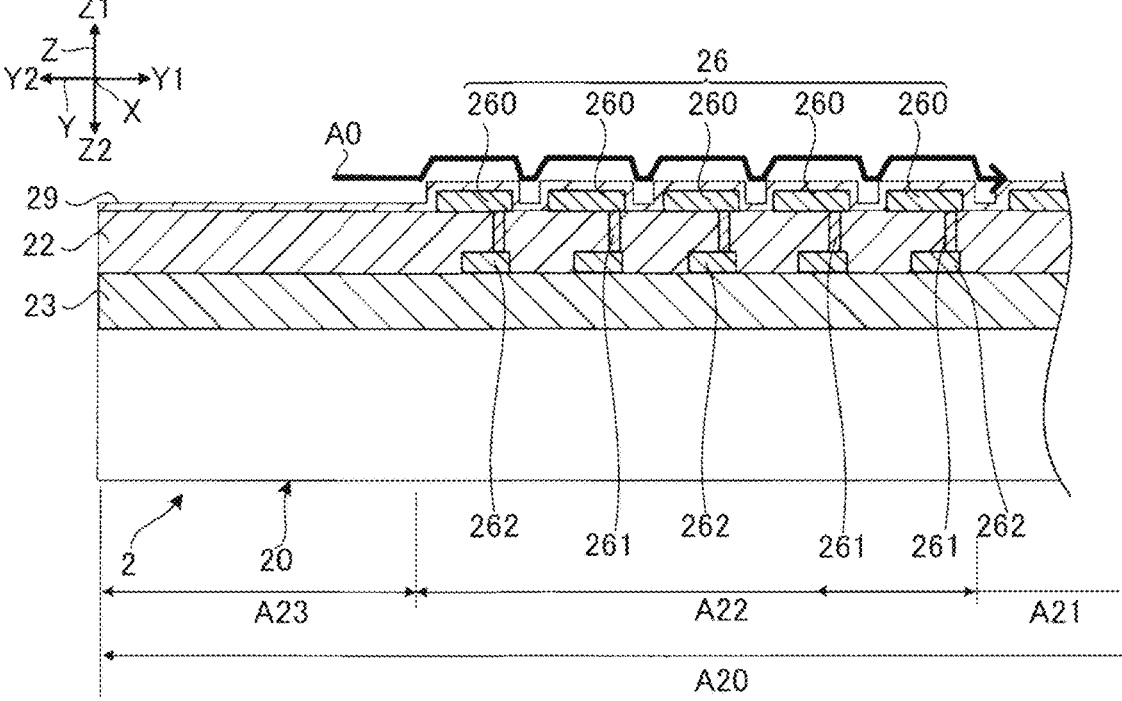
FIG. 8 is a diagram illustrating the impurity infiltration path in the surrounding electrode of the present embodiment.

FIG. 7 is a diagram illustrating an impurity infiltration path in a surrounding electrode 26*x* of a comparative example. FIG. 8 is a diagram illustrating the impurity infiltration path in the surrounding electrode 26 of the present embodiment.

In the comparative example illustrated in FIG. 7, the surrounding electrode 26*x* is not divided into a plurality of parts. Therefore, an upper surface of the surrounding electrode 26*x* is flat. Therefore, an upper surface of the alignment film 29 on the surrounding electrode 26*x* is also flat. Therefore, there is concern that impurities generated from the sealing member 4 may directly infiltrate the display area A10 through a space between the first substrate 2 and the liquid crystal layer 5, as indicated by an arrow Ax.

In the present embodiment illustrated in FIG. 8, the surrounding electrode 26 is divided into the plurality of electrode portions 260 spaced apart from each other, and the plurality of electrode portions 260 are arranged from the outer edge of the first substrate 2 to the display area A10. Therefore, the surrounding electrode 26 has a plurality of irregularities. Therefore, the upper surface of the alignment film 29 has a plurality of irregularities. Therefore, impurities do not pass straight from the sealing member 4 to the display area A10, as indicated by an arrow A0. Since the surrounding electrode 26 has a plurality of irregularities, it is possible to lengthen the path through which impurities infiltrate the display area A10 in the present embodiment as compared with that in the comparative example.

As can be seen from FIGS. 7 and 8, in the present embodiment, since the surrounding electrode 26 is divided into the plurality of electrode portions 260, it is possible to lengthen the impurity infiltration path from the sealing member 4 to the display area A10. Therefore, it is possible to curb deterioration in display quality.

Further, as illustrated in FIG. 4, each of the plurality of electrode portions 260 is disposed along the outer edge of the display area A10 in plan view. From another perspective, each of the plurality of electrode portions 260 extends in a direction intersecting the shortest path between the display area A10 and the sealing area A23 in plan view. Since each electrode portion 260 is disposed along the outer edge of the display area A10 in plan view, the surrounding electrode 26 has the plurality of irregularities in a direction from the sealing area A23 to the display area A10. Therefore, it is possible to lengthen the path through which impurities infiltrate the display area A10 from the sealing member 4.

In particular, each of the plurality of electrode portions 260 surrounds the display area A10 in plan view. Therefore, it is possible to lengthen the path through which impurities infiltrate the display area A10 from the sealing member 4 an entire range outside the display area A10. Therefore, it is possible to enhance an effect that it is difficult for impurities to infiltrate the display area A10. Each electrode portion 260 may not surround the display area A10 in plan view, and there may be a partially missing portion.

Further, the plurality of dummy pixel electrodes 25*d* are disposed between the intermediate area A22 and the display area A10. Therefore, the surrounding electrode 26 is disposed outside the plurality of dummy pixel electrodes 25*d* in plan view. Since the surrounding electrode 26 is disposed outside the plurality of dummy pixel electrodes 25*d*, it is possible to more effectively curb impurities infiltrating the display area A10. Since there is the dummy pixel electrode 25*d*, it is possible to lengthen a distance from the sealing member 4 to the display area A10 as compared with a case in which there is no dummy pixel electrode 25$d$. Therefore, it is possible to more effectively curb impurities infiltrating the display area A10. The plurality of dummy pixel electrodes 25$d$ may be omitted.

Further, as illustrated in FIGS. 5 and 6, a width W1 of each of the plurality of electrode portions 260 is smaller than a width W0 of the pixel electrode 25. Since the width W1 is smaller than the width W0, the path through which impurities infiltrate the display area A10 can be lengthened as compared with a case in which the width W1 is equal to or greater than the width W0. That is, since the surrounding electrode 26 is divided into the plurality of electrode portions 260 so that the width W1 is smaller than the width W0, it is possible to lengthen the infiltration path. The width W1 may be equal to or greater than the width W0.

Further, the separation distance between the electrode portions 260 is not particularly limited and may be the width W1 or more or the width W1 or less. However, since the separation distance is set to the width W1 or less, it is possible to effectively curb impurities infiltrating the display area A10 without excessively increasing a planar area of the first substrate 2. Further, a height of the electrode portion 260, that is, a length in the Z1 direction is substantially equal to a height of the pixel electrode 25, but may be different.

B. Second Embodiment

A second embodiment will be described. In each of the following examples, elements whose functions are the same as those in the first embodiment are denoted by the reference signs used in the description of the first embodiment, and detailed description thereof is omitted appropriately.

Figure 9:
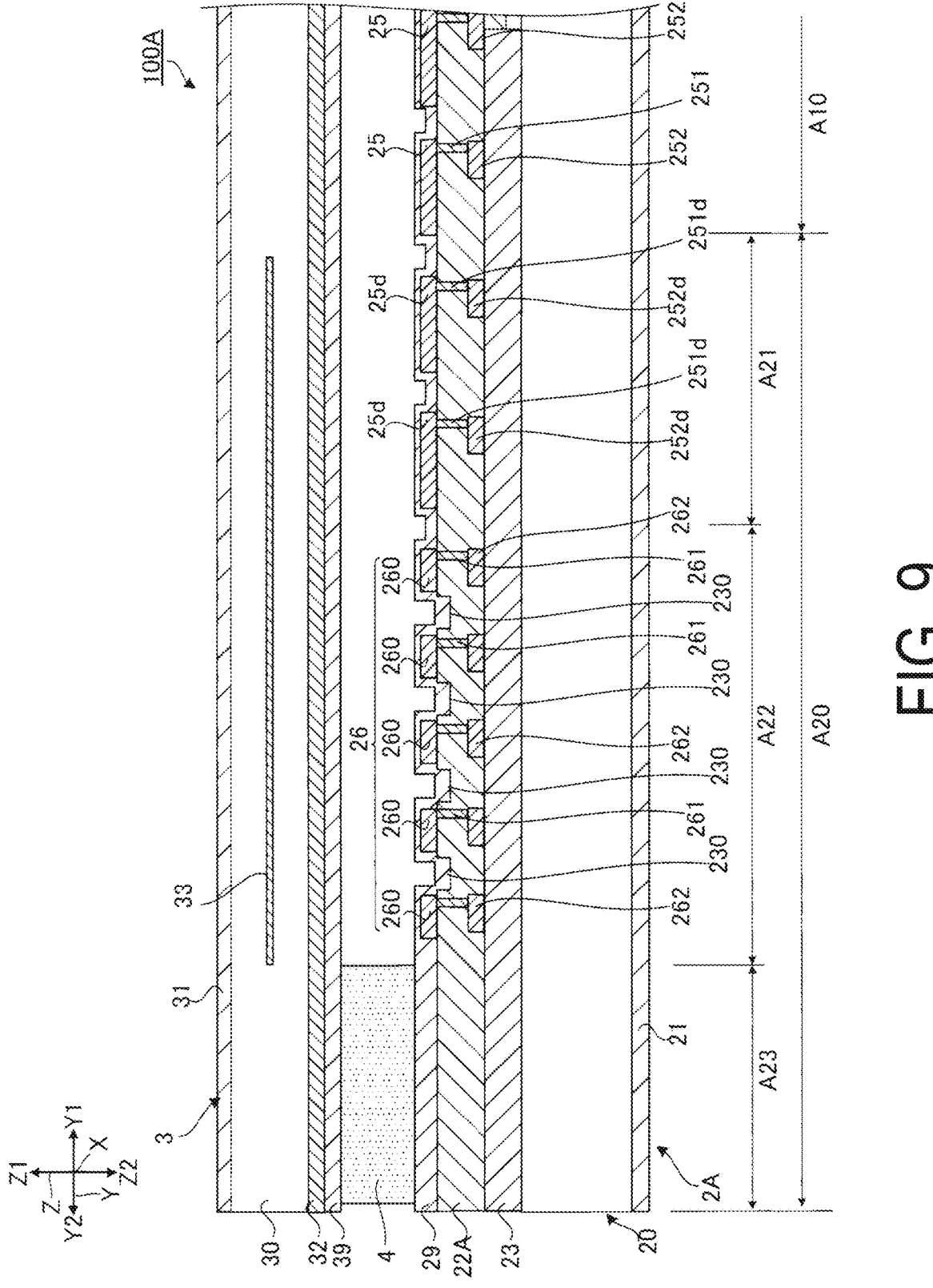
FIG. 9 is a cross-sectional view illustrating a portion of an electro-optical apparatus according to a second embodiment.

FIG. 9 is a cross-sectional view illustrating a portion of an electro-optical apparatus 100A of the second embodiment. The electro-optical apparatus 100A illustrated in FIG. 9 includes a first substrate 2A instead of the first substrate 2 of the first embodiment. The first substrate 2A differs from the first substrate 2 of the first embodiment in that the first substrate 2A includes a first insulating layer 22A instead of the first insulating layer 22.

Figure 10:
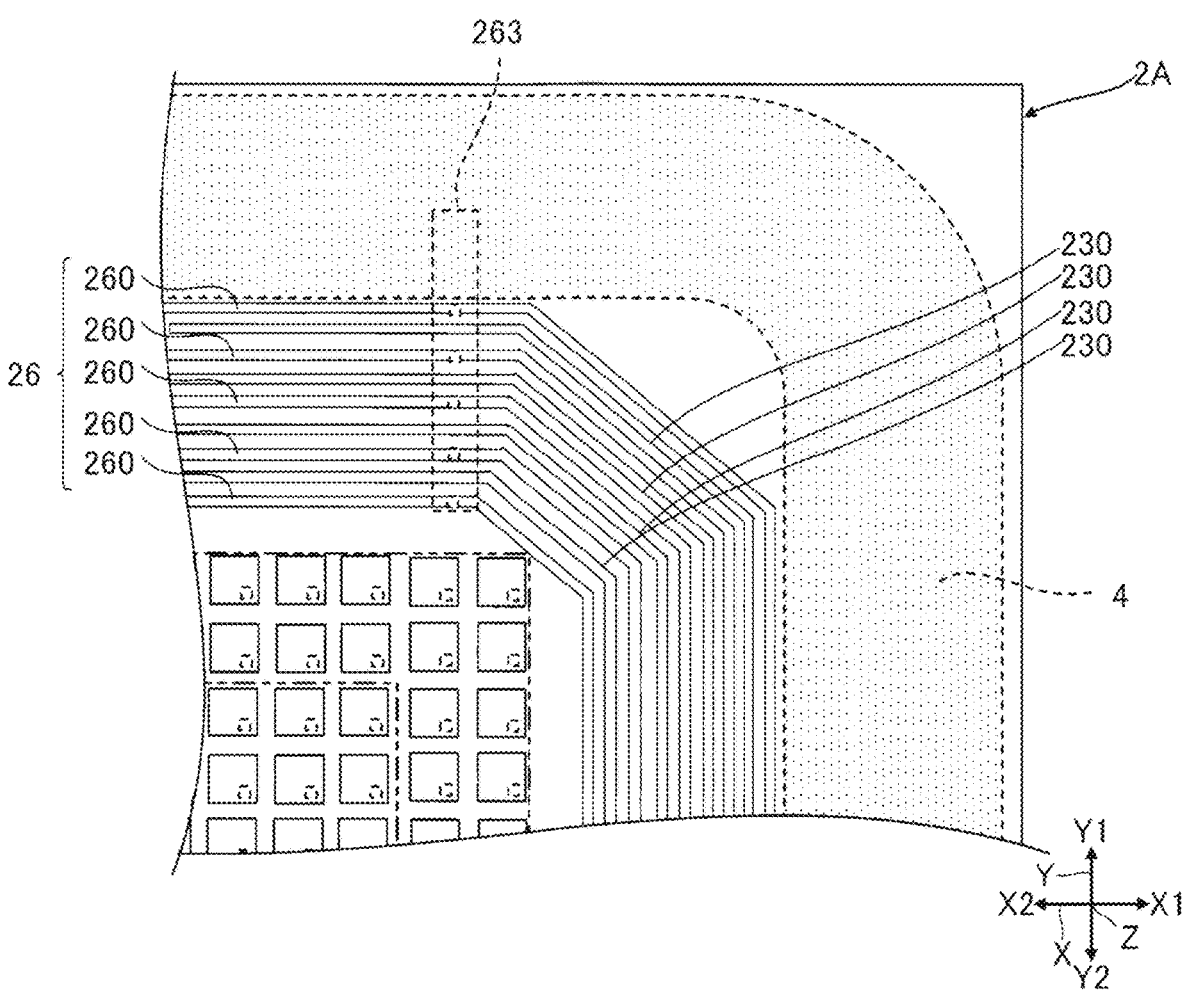
FIG. 10 is a cross-sectional view illustrating a portion of a first substrate in FIG. 9.

FIG. 10 is a cross-sectional view illustrating a portion of the first substrate 2A in FIG. 9. As illustrated in FIGS. 9 and 10, the first insulating layer 22A includes a plurality of recesses 230 spaced apart from each other. Each recess 230 is a recess formed in the first insulating layer 22A.

The plurality of recesses 230 are provided in the intermediate area A22. The plurality of recesses 230 do not overlap the surrounding electrode 26 in plan view. Therefore, the plurality of recesses 230 do not overlap the plurality of electrode portions 260 and are provided at different positions from the plurality of electrode portions 260. Since the plurality of recesses 230 are provided, it is possible to make the irregularities on the upper surface of the surrounding electrode 26 larger than a case in which the plurality of recesses 230 are not provided. Therefore, it is possible to increase the irregularities on the alignment film 29. Therefore, it is possible to lengthen the path through which impurities infiltrate the display area A10 through a space between the first substrate 2A and the liquid crystal layer 5. Therefore, since the plurality of recesses 230 are provided, it is possible to more effectively curb display defects such as occurrence of display stains caused by impurities infiltrating the display area A10 as compared to a case in which the recesses 230 are not provided.

Further, the plurality of recesses 230 are disposed along the outer edge of the display area A10 in plan view. From another perspective, the plurality of recesses 230 have a linear shape extending in the direction intersecting the shortest path between the display area A10 and the sealing area A23 in plan view. Since each recess 230 is disposed along the outer edge of the display area A10 in plan view, the upper surface of the alignment film 29 has a plurality of irregularities in the direction from the sealing area A23 to the display area A10. Therefore, it is possible to lengthen the path through which impurities infiltrate the display area A10 from the sealing member 4.

In particular, each of the plurality of recesses 230 surrounds the display area A10 in plan view. Therefore, it is possible to lengthen the path through which impurities infiltrate the display area A10 from the sealing member 4 the entire range outside the display area A10. Therefore, it is possible to enhance an effect that it is difficult for impurities to infiltrate the display area A10. Each recess 230 may not surround the display area A10 in plan view. The recesses 230 may be scattered to surround the liquid crystal layer 5.

Further, the plurality of electrode portions 260 and the plurality of recesses 230 are disposed alternately in plan view. Therefore, a large recess is formed of the electrode portion 260 protruding from the first insulating layer 22 and the recess 230 that is a recess formed in the first insulating layer 22. Therefore, it is possible to lengthen the path through which impurities infiltrate the display area A10 from the sealing member 4. Although one recess 230 is provided between two adjacent electrode portions 260 in the present embodiment, two or more recesses may be provided between the two adjacent electrode portions 260.

Furthermore, each recess 230 does not overlap the plurality of electrode portions 260 in plan view. Therefore, each recess 230 does not overlap the second contact 261 in plan view, and is provided at a different position from the second contact 261 in plan view. Therefore, there is no need to change the disposition of the second contact 261 since the recess 230 is provided.

Figure 11:
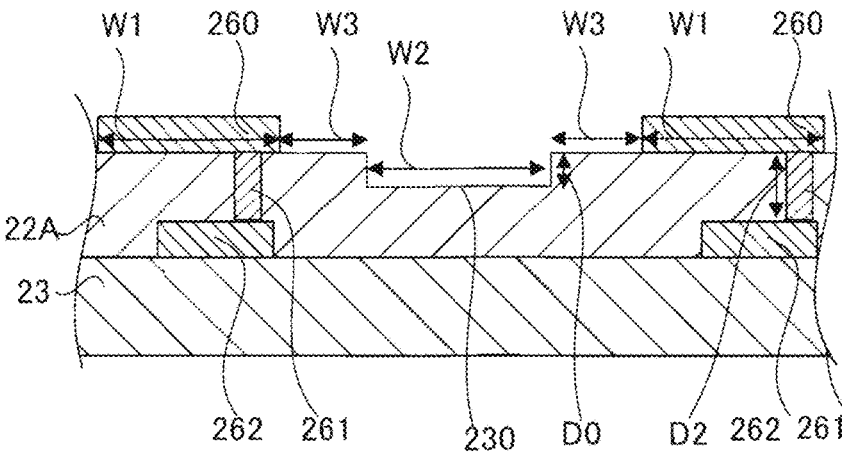
FIG. 11 is an enlarged view of a recess illustrated in FIG. 9.

FIG. 11 is an enlarged view of the recess 230 illustrated in FIG. 9. As illustrated in FIG. 11, in the present embodiment, a depth DO of the recess 230 is smaller than a depth D2 of the second through hole H2. The depth DO may be equal to or greater than the depth D2.

Further, the width W1 of the electrode portion 260 is substantially equal to the width W2 of the recess 230, but the width W1 may be larger or smaller than the width W2. Further, a distance W3 from the electrode portion 260 to the recess 230 is smaller than the width W2 of the recess 230. Since the distance W3 is smaller than the width W2, an excessive increase in a planar area of the intermediate area A22 is curbed as compared with a case in which the distance W3 is equal to or greater than the width W2. The width W3 may be equal to or greater than the width W2. The width W1 is, for example, 0.1 μm or more and 1.5 μm or less. The width W2 is, for example, 0.1 μm or more and 1.5 μm or less. The width W3 is, for example, 0.1 μm or more and 1.0 μm or less.

C. Third Embodiment

A third embodiment will be described. In each of the following examples, elements whose functions are the same as those in the second embodiment are denoted by the reference signs used in the description of the second embodiment, and detailed description thereof is omitted appropriately.

Figure 12:
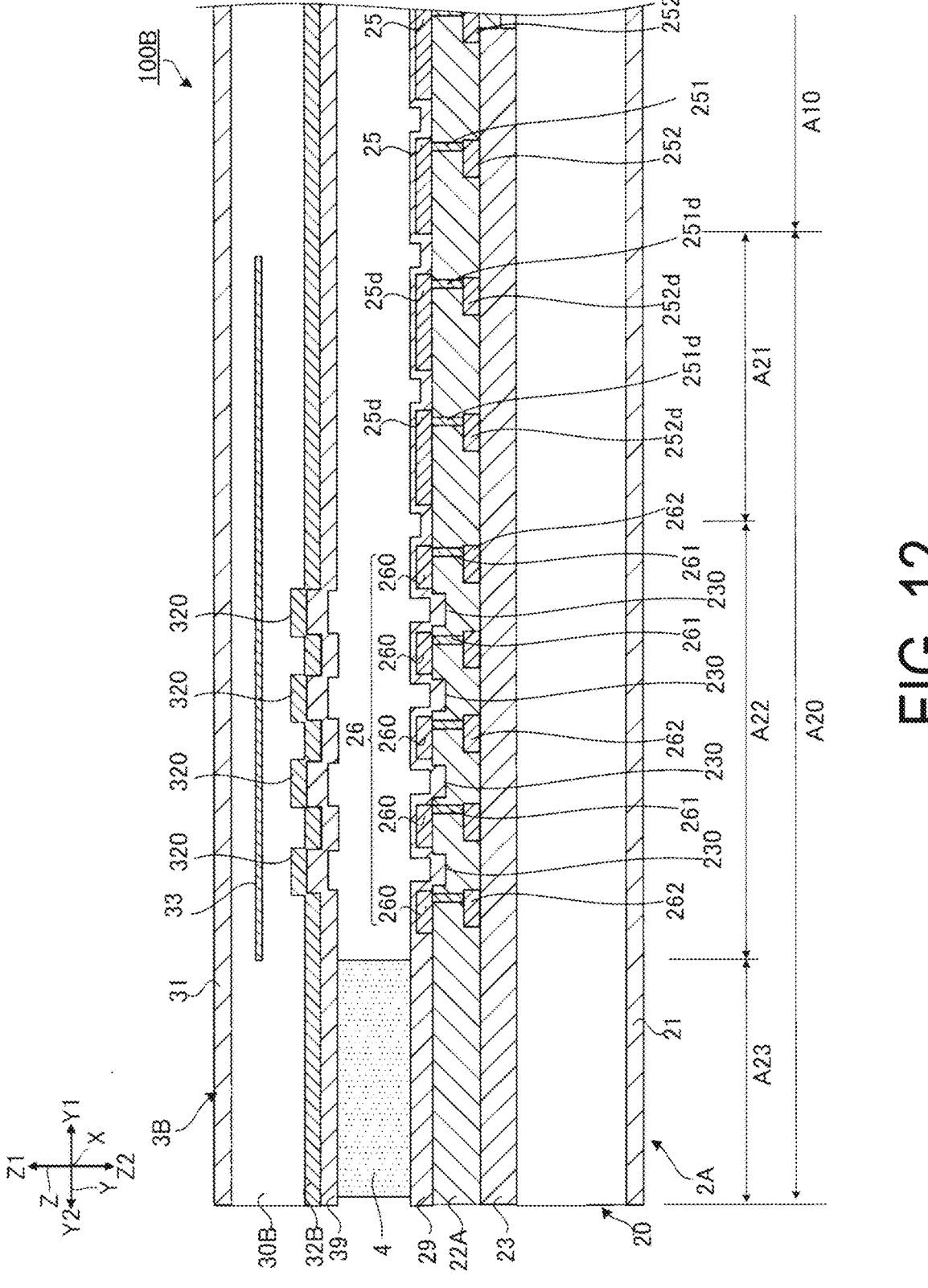
FIG. 12 is a cross-sectional view illustrating a portion of an electro-optical apparatus according to a third embodiment.
Figure 13:
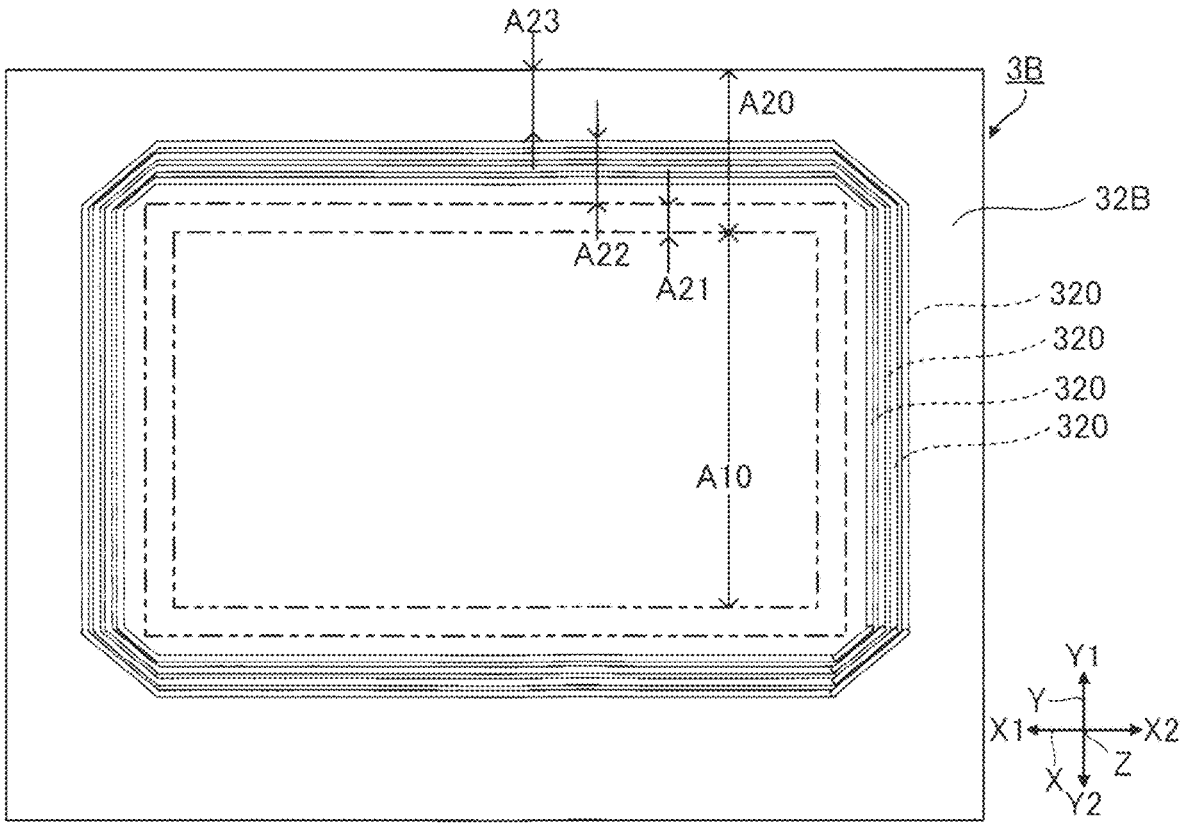
FIG. 13 is a plan view of a counter electrode illustrated in FIG. 12.

FIG. 12 is a cross-sectional view illustrating a portion of an electro-optical apparatus 100B of the third embodiment. FIG. 13 is a plan view of the counter electrode illustrated in FIG. 12. The electro-optical apparatus 100B illustrated in FIG. 12 includes a stack 30B and a counter electrode 32B instead of the stack 30 and counter electrode 32 of the second embodiment.

As illustrated in FIG. 12, a plurality of second recesses 320 are provided in the stack 30B. The plurality of second recesses 320 have the same configuration as the plurality of recesses 230 except that they are provided in the stack 30B. As illustrated in FIG. 13, the plurality of second recesses 320 are provided in the intermediate area A22. Therefore, the plurality of second recesses 320 are located outside the plurality of pixel electrodes 25 in plan view. The plurality of second recesses 320 are disposed from an outer edge of the second substrate 3B to the display area A10.

Since the plurality of second recesses 320 are provided, the counter electrode 32B has irregularities in the intermediate area A22. Therefore, irregularities are formed at a surface of the alignment film 39. Therefore, it is possible to curb concern that impurities in the sealing member 4 may infiltrate the display area A10 through a space between the second substrate 3B and the liquid crystal layer 5. Therefore, according to the present embodiment, it is possible to curb impurities infiltrating the display area A10 between the space between the first substrate 2A and the liquid crystal layer 5 and a space between the second substrate 3B and the liquid crystal layer 5. Therefore, it is possible to more effectively curb display defects such as occurrence of display stains.

Further, each of the plurality of second recesses 320 extends in the direction intersecting the shortest path between the display area A10 and the sealing area A23 in plan view. In particular, each of the plurality of second recesses 320 surrounds the liquid crystal layer 5 in plan view. Therefore, in the second substrate 3B, it is possible to lengthen the path through which impurities infiltrate the display area A10 over the entire range outside the display area A10, similarly to the first substrate 2A.

D. Fourth Embodiment

A fourth embodiment will be described. In each of the following examples, elements whose functions are the same as those in the first embodiment are denoted by the reference signs used in the description of the first embodiment, and detailed description thereof is omitted appropriately.

Figure 14:
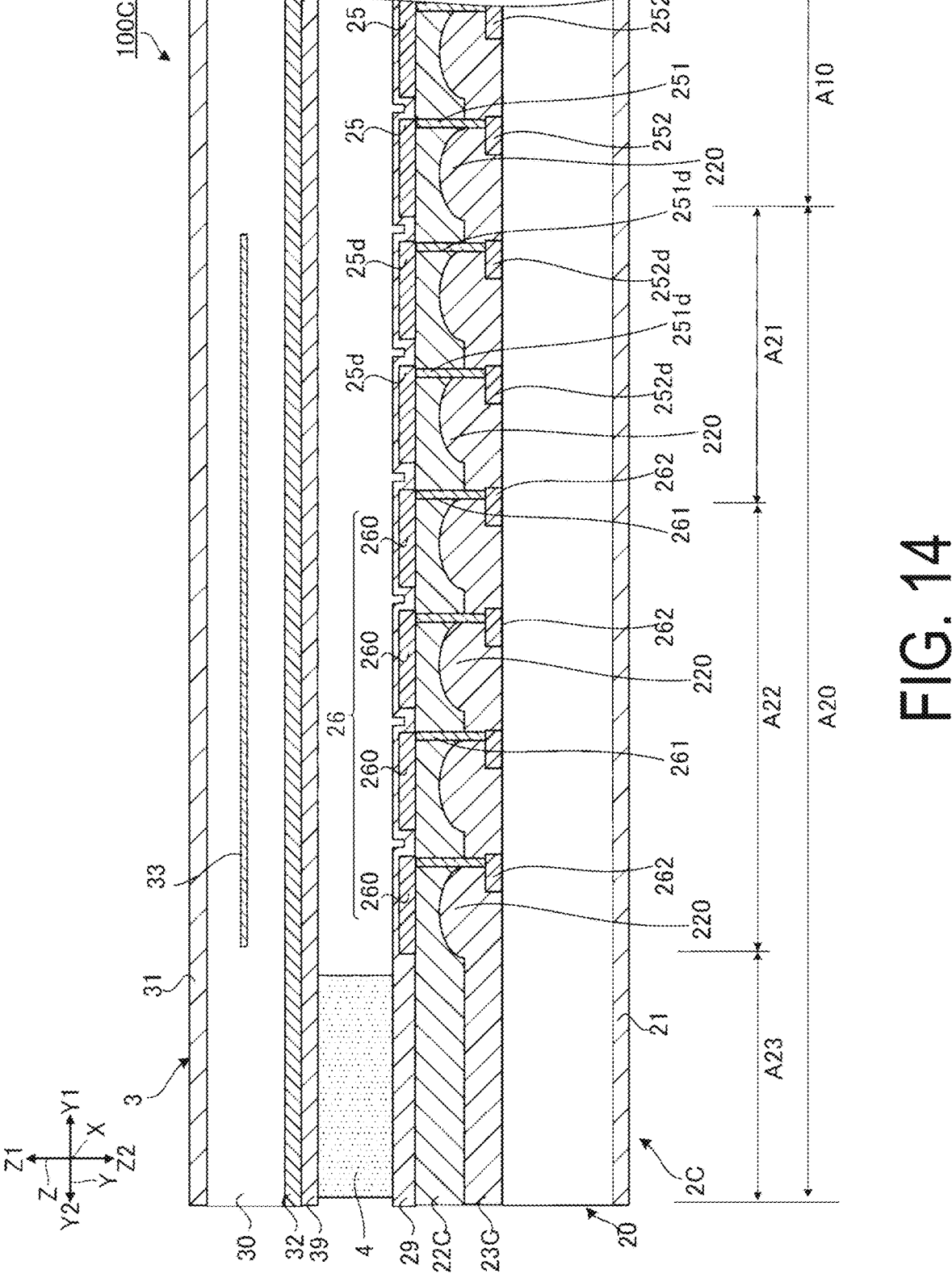
FIG. 14 is a cross-sectional view illustrating a portion of an electro-optical apparatus according to a fourth embodiment.

FIG. 14 is a cross-sectional view illustrating a portion of an electro-optical apparatus 100C according to the fourth embodiment. The electro-optical apparatus 100C illustrated in FIG. 14 includes a first insulating layer 22C and a second insulating layer 23C instead of the first insulating layer 22 and second insulating layer 23 of the first embodiment. The first insulating layer 22C and the second insulating layer 23C correspond to "insulating layers".

The second insulating layer 23C includes a plurality of lenses 220. Each lens 220 has a convex lens surface that projects toward the liquid crystal layer 5. The plurality of lenses 220 are provided corresponding to the plurality of pixel electrodes 25, the plurality of dummy pixel electrodes 25d, and the plurality of electrode portions 260. One lens 220 corresponds to one pixel electrode 25, and one pixel electrode 25 overlaps one lens 220 in plan view. One lens 220 corresponds to one dummy pixel electrode 25d, and one dummy pixel electrode 25d overlaps one lens 220 in plan view. One lens 220 corresponds to one electrode portion 260, and one electrode portion 260 overlaps one lens 220 in plan view.

The first insulating layer 22C has a plurality of concave surfaces that come into contact with the lens surfaces of the plurality of lenses 220. Further, a refractive index of the first insulating layer 22C and a refractive index of the second insulating layer 23C are different from each other.

The first contact 251, the second contact 261, and the third contact 251d are contact plugs that penetrate the first insulating layer 22C and the second insulating layer 23C. It is easier to increase an aspect ratio of the contact plug compared to a so-called trench type electrode. Therefore, since the contact plug is used for the second insulating layer 23C including the lens 220, reduction in a planar area of the lens 220 is curbed. Further, in addition to the first contact 251 being the contact plug, since the second contact 261 and the third contact 251d are contact plugs, the lens 220 is not formed only in association with the pixel electrode 25, and the lens 220 can be formed in association with the dummy pixel electrode 25d and the electrode portion 260. That is, the lens 220 can be provided over substantially the entire second insulating layer 23C. Since the lens 220 is provided over substantially the entire area of the second insulating layer 23C, patterning for forming the lens 220 only in the display area A10 of the second insulating layer 23C is not necessary. Therefore, manufacturing is easy. The lens 220 may also be provided in the sealing area A23.

Furthermore, each lens 220 may protrude in a direction opposite to the liquid crystal layer 5. Further, the first insulating layer 22C may include a convex lens protruding in a direction opposite to the liquid crystal layer 5, and the second insulating layer 23C may include a concave surface that comes into contact with the convex lens.

E. Modification Examples

The embodiments illustrated above may be modified in various ways. Specific modifications that can be applied to the above-described embodiments are illustrated below. Two or more aspects arbitrarily selected from examples below may be combined appropriately as long as contradiction is not caused.

In each of the embodiments described above, the electro-optical apparatus 100 using an active matrix scheme is illustrated, but the present embodiment is not limited thereto and a drive scheme for the electro-optical apparatus 100 may be, for example, a passive matrix scheme.

The driving scheme of the "electro-optical apparatus" is not limited to a vertical electric field scheme, but may be a transverse electric field scheme. An example of the transverse electric field scheme may include an In Plane Switching (IPS) mode. Further, examples of the vertical electric field scheme may include a Twisted Nematic (TN) mode, a Vertical Alignment (VA) mode, a PVA mode, and an Optically Compensated Bend (OCB) mode.

Furthermore, in the above-described description, a liquid crystal display apparatus has been described as an example of the "electro-optical apparatus", but the "electro-optical apparatus" is not limited thereto. For example, the "electro-optical apparatus" can also be applied to an image sensor or the like.

2. Electronic Device

The electro-optical apparatus 100 can be used in various electronic devices.

Figure 15:
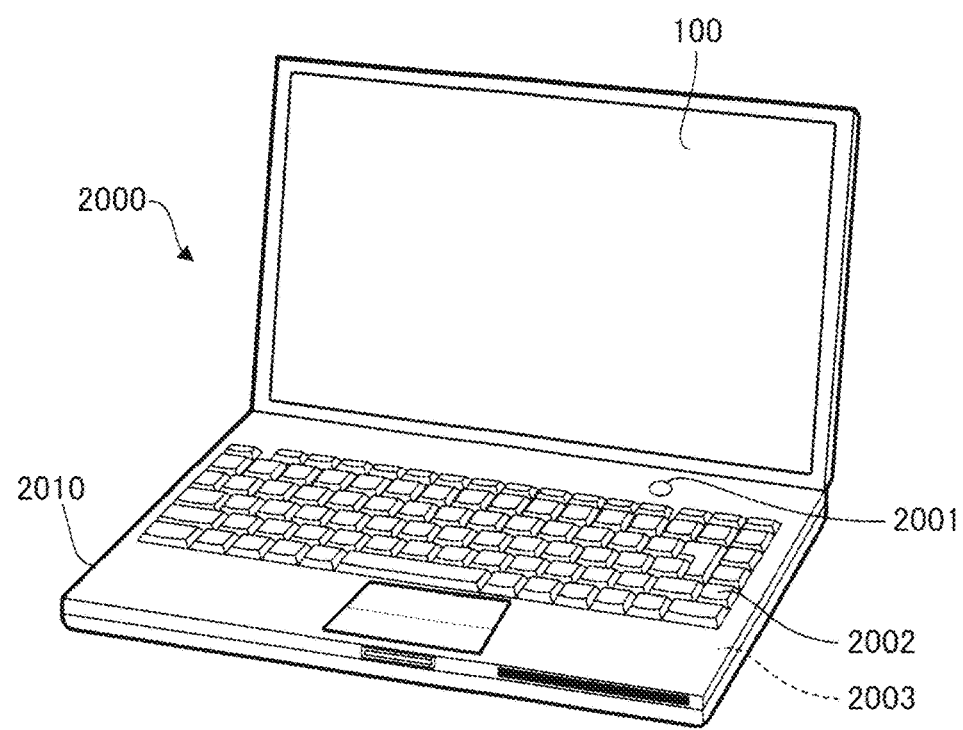
FIG. 15 is a perspective view illustrating a personal computer, which is an example of an electronic device.

FIG. 15 is a perspective view illustrating a personal computer 2000, which is an example of an electronic device. The personal computer 2000 includes the electro-optical apparatus 100 that displays various images, a body unit 2010 in which a power switch 2001 and a keyboard 2002 are installed, and a control unit 2003. The control unit 2003 includes, for example, a processor and a memory, and controls an operation of the electro-optical apparatus 100.

Figure 16:
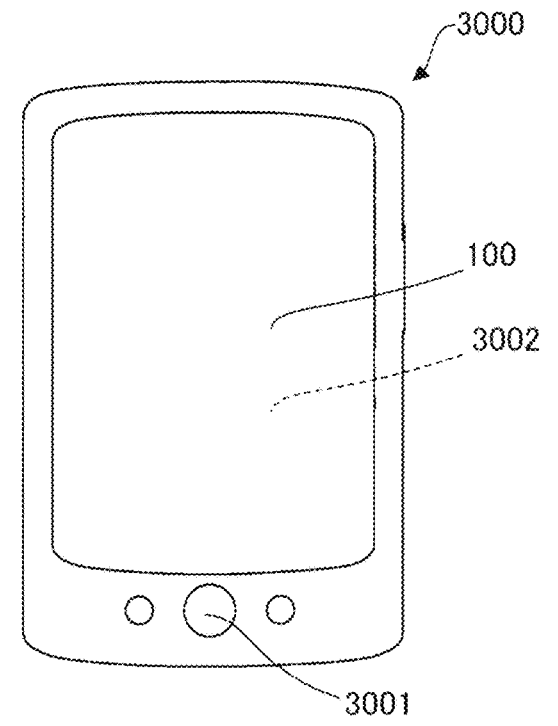
FIG. 16 is a plan view illustrating a smartphone, which is an example of an electronic device.

FIG. 16 is a plan view illustrating a smartphone 3000, which is an example of an electronic device. The smartphone 3000 includes an operation button 3001, an electro-optical apparatus 100 that displays various images, and a control unit 3002. Screen content displayed on the electro-optical apparatus 100 is changed according to an operation of the operation button 3001. The control unit 3002 includes, for example, a processor and a memory, and controls an operation of the electro-optical apparatus 100.

Figure 17:
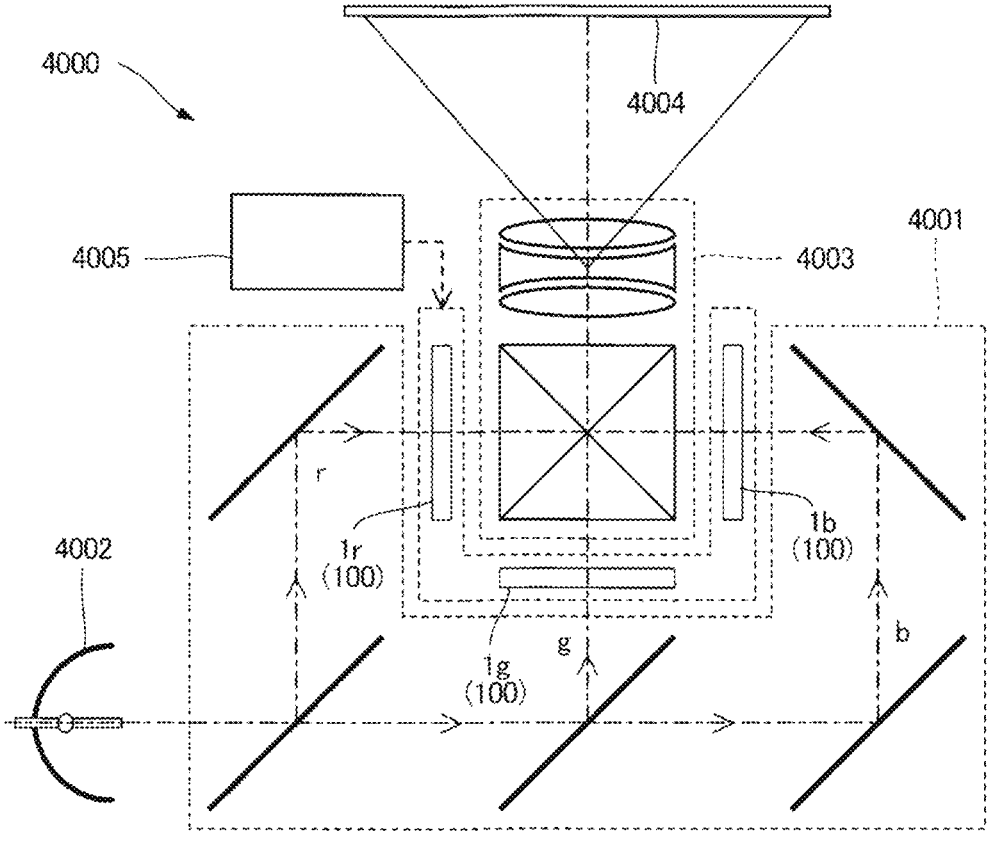
FIG. 17 is a schematic diagram illustrating a projector that is an example of an electronic device.

FIG. 17 is a schematic diagram illustrating a projector that is an example of an electronic device. A projection type display apparatus 4000 is, for example, a three-panel projector. An electro-optical apparatus 1r is an electro-optical apparatus 100 corresponding to a red display color, an electro-optical apparatus 1g is an electro-optical apparatus 100 corresponding to a green display color, and an electro-optical apparatus 1b is an electro-optical apparatus 100 corresponding to a blue display color. That is, the projection type display apparatus 4000 includes three electro-optical apparatuses 1r, 1g, and 1b corresponding to respective red, green, and blue display colors. A control unit 4005 includes, for example, a processor and a memory, and controls an operation of the electro-optical apparatus 100.

An illumination optical system 4001 supplies a red component r of the light emitted from an illumination apparatus 4002, which is a light source, to the electro-optical apparatus 1r, a green component g to the electro-optical apparatus 1g, and a blue component b to the electro-optical apparatus 1b. Each of the electro-optical apparatuses 1r, 1g, and 1b functions as an optical modulator such as a light valve that modulates each monochromatic light beam supplied from the illumination optical system 4001 according to a displayed image. A projection optical system 4003 combines the light emitted from the respective electro-optical apparatuses 1r, 1g, and 1b and projects the combined light onto a projection surface 4004.

The electronic device includes the electro-optical apparatus 100 described above and a control unit 2003, 3002, or 4005. In the electro-optical apparatus 100 described above, deterioration in display quality is curbed. Therefore, since the electro-optical apparatus 100 is included, it is possible to curb deterioration in display quality of the personal computer 2000, the smartphone 3000, or the projection type display apparatus 4000. The same effects can also be obtained when electro-optical apparatus 100A, 100B, or 100C is applied instead of the electro-optical apparatus 100.

An electronic device to which the electro-optical apparatus of the present disclosure is applied is not limited to the illustrated device, and examples thereof may include a personal digital assistant (PDA), a digital still camera, a television, a video camera, a car navigation apparatus, an in-vehicle display, an electronic notebook, an electronic paper, a calculator, a word processor, a workstation, a videophone, and a point of sale (POS) terminal. Further, examples of the electronic device to which the present disclosure is applied may include a printer, a scanner, a copier, a video player, and a device including a touch panel.

Although the present disclosure has been described above based on the preferred embodiments, the present disclosure is not limited to the above-described embodiments. Further, a configuration of the respective portions of the present disclosure can be replaced with any configuration that performs the same function as that in the embodiment described above, or any configuration can be added.

What is claimed is:

1. An electro-optical apparatus including a first substrate, a second substrate, an electro-optical layer disposed between the first substrate and the second substrate and having optical characteristics changing depending on an electric field, and a sealing member disposed outside the electro-optical layer between the first substrate and the second substrate in plan view, the electro-optical apparatus comprising:

a display area for displaying an image, a sealing area located outside the display area in plan view and provided with the sealing member, and an intermediate area located between the display area and the sealing area in plan view, wherein the first substrate includes a first electrode provided for each of pixels included in the display area;

a first coupling electrode provided in the display area and farther from the electro-optical layer than the first electrode in a first direction in which the first substrate and the second substrate overlap;

an insulating layer provided between the first electrode and the first coupling electrode;

a first contact provided in the insulating layer and configured to electrically couple the first electrode to the first coupling electrode;

a second electrode provided in the intermediate area and located in the same layer as the first electrode;

a second coupling electrode provided in the intermediate area and farther from the electro-optical layer than the second electrode in the first direction; and a second contact provided in the insulating layer and configured to electrically couple the second electrode to the second coupling electrode, the first contact has a plug shape and is disposed in a first through hole provided in the insulating layer, the second contact has a plug shape and is disposed in a second through hole provided in the insulating layer, and the second electrode is divided into a plurality of electrode portions directed from an outer edge of the first substrate to the display area, wherein the insulating layer includes a recess provided at a position different from the plurality of electrode portions in plan view in the intermediate area.

2. The electro-optical apparatus according to claim 1, wherein each of the plurality of electrode portions is disposed along an outer edge of the display area in plan view.

3. The electro-optical apparatus according to claim 2, wherein the plurality of electrode portions surround the display area in plan view.

4. The electro-optical apparatus according to claim 1, wherein the recess is disposed along an outer edge of the display area in plan view.

5. The electro-optical apparatus according to claim 4, wherein the recess surrounds the display area in plan view.

6. The electro-optical apparatus according to claim 4, wherein the insulating layer is provided with a plurality of recesses including the recess, and the plurality of electrode portions and the plurality of recesses are disposed alternately in plan view.

7. The electro-optical apparatus according to claim 4, wherein the recess is provided at a different position from the second contact in plan view.

8. The electro-optical apparatus according to claim 4, wherein a depth of the recess is smaller than a depth of the second through hole.

9. The electro-optical apparatus according to claim 1, wherein the first electrode is a pixel electrode, a dummy pixel electrode disposed outside the display area in plan view is included, and the second electrode is disposed outside the dummy pixel electrode in plan view.

10. The electro-optical apparatus according to claim 1, wherein a width of each of the plurality of electrode portions is smaller than a width of the first electrode.

11. The electro-optical apparatus according to claim 1, wherein the second substrate includes a counter electrode provided in the display area and facing the first electrode, and the counter electrode has a plurality of irregularities in the intermediate area.

12. An electronic device comprising:

the electro-optical apparatus according to claim 1; and a control unit configured to control an operation of the electro-optical apparatus.

\* \* \* \* \*